(12) United States Patent
Kurata et al.

(10) Patent No.: US 10,436,898 B2
(45) Date of Patent: Oct. 8, 2019

(54) OBJECT RECOGNITION DEVICE

(71) Applicant: HITACHI, LTD., Chiyoda-ku, Tokyo (JP)

(72) Inventors: Kenichirou Kurata, Tokyo (JP); Shigeru Matsuo, Tokyo (JP); Noriyasu Hasejima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 476 days.

(21) Appl. No.: 15/102,157

(22) PCT Filed: Dec. 26, 2013

(86) PCT No.: PCT/JP2013/084953
§ 371 (c)(1),
(2) Date: Jun. 6, 2016

(87) PCT Pub. No.: WO2015/097824
PCT Pub. Date: Jul. 2, 2015

(65) Prior Publication Data
US 2016/0313444 A1    Oct. 27, 2016

(51) Int. Cl.
*G01S 13/86* (2006.01)
*G01S 13/93* (2006.01)
(Continued)

(52) U.S. Cl.
CPC .......... *G01S 13/931* (2013.01); *G01S 13/867* (2013.01); *G01S 17/023* (2013.01); *G01S 17/936* (2013.01);
(Continued)

(58) Field of Classification Search
CPC .... G01S 13/867; G01S 13/931; G01S 17/023; G01S 17/936; G01S 2013/9367; G06K 9/00791; G08G 1/166
(Continued)

(56) References Cited

U.S. PATENT DOCUMENTS 7,046,822 B1    5/2006   Knoeppel et al.
2008/0079954 A1*  4/2008   Iwaki .................. G01C 3/08
                                                356/614
(Continued)

FOREIGN PATENT DOCUMENTS

CN    101996403 A    3/2011
JP    2003-502745 A   1/2003
(Continued)

OTHER PUBLICATIONS

PCT International Search Report issued in application No. PCT/JP2013/084953 dated Apr. 8, 2014.
(Continued)

*Primary Examiner* — Timothy A Brainard
(74) *Attorney, Agent, or Firm* — Foley & Lardner LLP

(57) ABSTRACT

An object recognition device includes a camera (113) and a radar (114), detects an estimated plane region estimated to be a plane from an image from the camera (113) (S202), and calculates a plane equation for the estimated plane region (S207). The object recognition device interpolates and estimates distance data within the estimated plane region based on the plane equation and the measured distance data from the radar (S210) and obtains the distance to an object by using the distance data. Accordingly, it is possible to obtain dense distance data throughout the estimated plane region and to detect the distance to small objects and distant objects.

9 Claims, 9 Drawing Sheets

(51) Int. Cl.
*G06K 9/00* (2006.01)
*G01S 17/02* (2006.01)
*G01S 17/93* (2006.01)
*G08G 1/16* (2006.01)

(52) U.S. Cl.
CPC ......... *G06K 9/00791* (2013.01); *G08G 1/166* (2013.01); *G01S 2013/9367* (2013.01)

(58) Field of Classification Search
USPC .......................................................... 342/52
See application file for complete search history.

(56) References Cited

U.S. PATENT DOCUMENTS

| 2009/0135065 | A1 | 5/2009 | Tsuchida et al. |
| 2011/0038510 | A1* | 2/2011 | Nakamura ......... G06K 9/00201 382/106 |
| 2012/0170808 | A1 | 7/2012 | Ogata et al. |
| 2013/0080111 | A1* | 3/2013 | Dunik ...................... G06T 7/70 702/152 |
| 2014/0063197 | A1 | 3/2014 | Yamamoto et al. |

FOREIGN PATENT DOCUMENTS

| JP | 2006-322856 A | 11/2006 |
| JP | 2007-226680 A | 9/2007 |
| JP | 2008-147978 A | 6/2008 |
| JP | 2010-256138 A | 11/2010 |
| JP | 2011-039918 A | 2/2011 |
| JP | 2011-069626 A | 4/2011 |
| JP | 2011-145166 A | 7/2011 |
| JP | 2012-122816 A | 6/2012 |
| JP | 2012-257107 A | 12/2012 |

OTHER PUBLICATIONS

Written Opinion of the International Searching Authority issued in application No. PCT/JP2013/084953 dated Apr. 8, 2014.
Chinese Office Action dated Apr. 1, 2017 as issued in Chinese Application No. 201380081838.1 and its English translation thereof.

* cited by examiner

* VANISHING POINT IS CALCULATED BASED ON IMAGE

OBJECT RECOGNITION DEVICE

TECHNICAL FIELD

The present invention relates to an object recognition device that recognizes an object based on measured distance data from a radar and an image from a camera.

BACKGROUND ART

To reduce automobile accidents and improve automobile safety, a safety system technology for detecting an obstacle and avoiding the obstacle or notifying a driver thereof is important. Furthermore, to reduce a load on the driver and obtain further safety, an autonomous travelling technology for recognizing a shape of unevenness, a bump, and the like of a road surface and for detecting travelable region is demanded.

On the other hand, cost reduction has always been strongly demanded of an automobile, and the cost reduction is an important issue for a safety system as well. In the object recognition device mounted on the automobile, a range finder such as a light detection and ranging (LIDAR) (laser radar) and a millimeter wave radar is used; however, to achieve the cost reduction of the device, it is necessary that the system is constituted of an inexpensive radar.

Since the inexpensive radar has a few scan lines and a rather low angular resolution, there is a large interval between scan positions (measurement points), whereby it is possible to obtain distance data for discrete positions only. Thus, object recognition and position detection are difficult by using the radar only. Therefore, a common system is combined with a camera to perform the object recognition and the position detection based on an image from the camera.

For example, PTL 1 discloses a method for calculating a distance to an obstacle by using, among distance data measured by the radar, the distance data existing within a rectangle region containing the obstacle detected in the image from the camera.

CITATION LIST

Patent Literature

PTL 1: Japanese Unexamined Patent Publication No. 2011-145166

SUMMARY OF INVENTION

Technical Problem

There is a problem in such method, however, in that although it is applicable in a case where an object to be detected has a large size such as a proceeding vehicle, it is difficult to obtain distance information in a case where the object has a small size such as an empty can or a stone on a road since it may be buried in a space between scan positions of the radar for which the distance data can be obtained. Furthermore, since the radar is mounted on a vehicle and is structured to perform a scan for every fixed angle, an interval between the scan positions becomes larger as the object is farther. Thus, it is highly possible that the distance data is not obtained for an object in the distance even when a size thereof is large.

Furthermore, in general, the radar of the automobile used for detecting an obstacle has a small detection range vertically and horizontally, and an object imaged in a peripheral part of the image from the camera is out of a range of distance measurement in many cases. In such cases, the distance data cannot be obtained even when the object has the large size, whereby there is a possibility that a control of collision prevention during high-speed travelling and the like may become difficult, for example. It is also not possible to detect a condition of a road surface in the distance, whereby it is not a configuration suitable for improving performance of the autonomous travelling.

The present invention has been devised in view of such actualities, and an objective thereof is to obtain an object recognition device capable of detecting a distance to small objects and distant objects by obtaining dense distance data throughout an entire region by estimating the distance data for a position where the distance data is not obtained since the position is buried in the space between the scan positions of the radar and for the peripheral part of the image from the camera where the distance data is not obtained since it is out of the detection range of the radar.

Solution to Problem

An object recognition device according to the present invention to solve the above issue is configured to recognize an object based on measured distance data from a radar and an image from a camera, and includes: an estimated plane region detection means configured to detect an estimated plane region estimated to be a plane from the image; a region plane estimation means configured to calculate a plane equation for the estimated plane region; and a distance data interpolation means configured to interpolate and estimate distance data within the estimated plane region based on the plane equation and the measured distance data.

Advantageous Effects of Invention

According to the present invention, it is possible to obtain the dense distance data throughout an entire estimated plane region. Thus, it is possible to detect the small objects and the distant objects that are buried in the space between the scan positions of the radar as well as to obtain the distance information of the object at a position that is out of the detection range of the radar. Note that any problem, configuration, and effect other than the above-described ones are clarified in descriptions of embodiments hereinafter.

DESCRIPTION OF EMBODIMENTS

Next, an embodiment of the present invention is described by using the drawings hereinafter.

An object recognition device according to this embodiment is mounted on a vehicle and is configured to recognize, for example, an object ahead of the vehicle such as a proceeding vehicle based on an imaged image from a camera and measured distance data from a radar. The object recognition device can be used for obstacle avoiding and autonomous travelling.

The object recognition device is configured to extract at least one or more estimated plane regions estimated to be a plane from an image, to verify whether or not the estimated plane region that has been extracted is a plane based on the measured distance data from the radar, and in the estimated plane region that has been verified to be the plane, to estimate a distance to a position, for which there is no measured distance data, by interpolating the measured distance data within the estimated plane region, and to improve a range and density of the distance data within the region.

Figure 1:
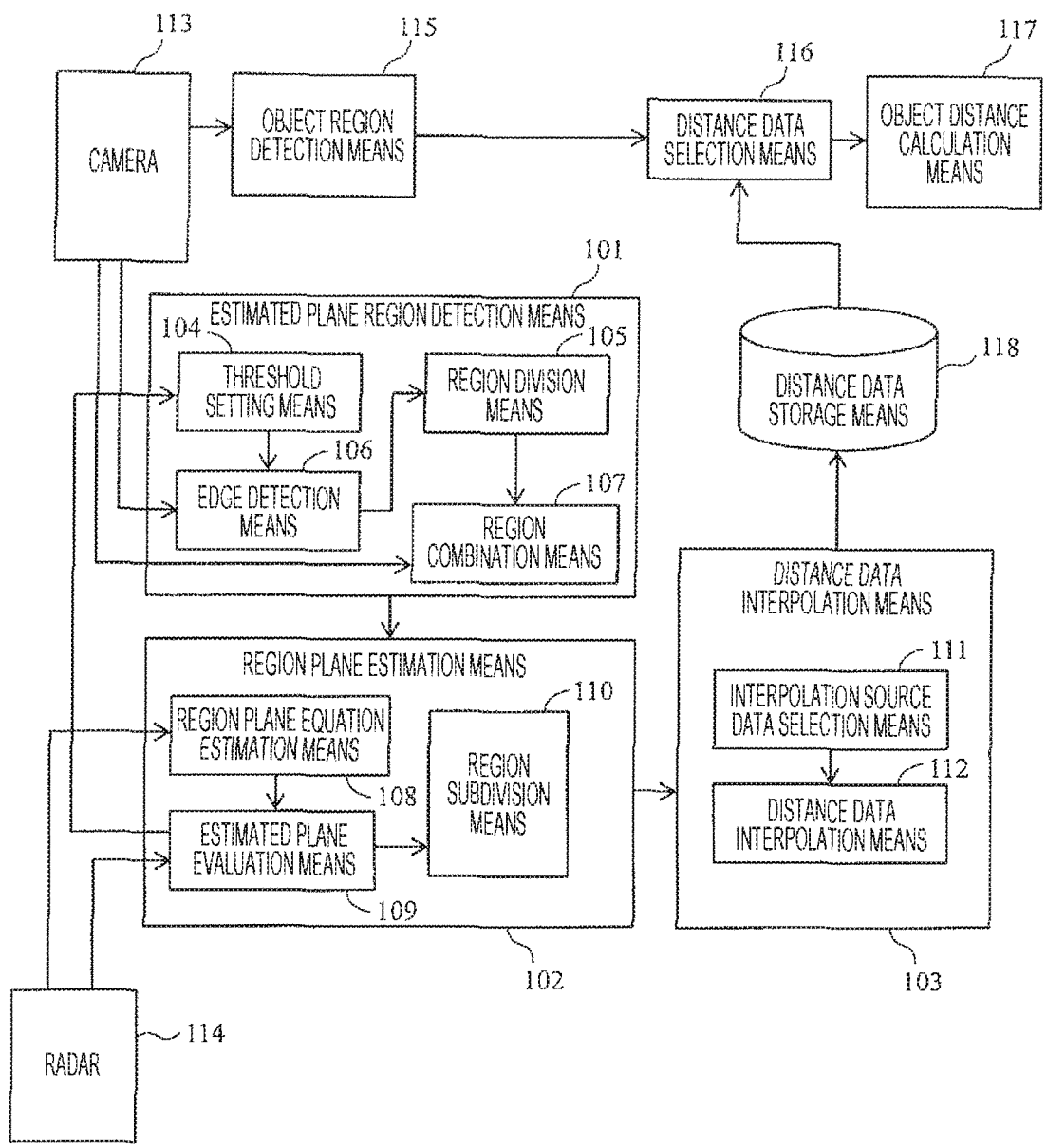
FIG. 1 is a system configuration diagram.

FIG. 1 is a system configuration diagram illustrating an exemplary object recognition device according to this embodiment.

As illustrated in FIG. 1, the object recognition device includes a camera 113, a radar 114, an estimated plane region detection means 101, a region plane estimation means 102, a distance data interpolation means 103, a distance data storage means 118, an object region detection means 115, a distance data selection means 116, and an object distance calculation means 117.

For example, a monocular camera such as a CCD and a CMOS is used as the camera 113, and a laser range finder is used as the radar 114. The camera 113 and the radar 114 are disposed facing ahead of the vehicle. Any means other than the camera 113 and the radar 114 of the object recognition device is functionally embodied, for example, by hardware such as ECU and by software installed in the hardware. In this embodiment, there is exemplified a case in which the object recognition device includes the camera 113 and the radar 114; however, it is also possible to configure such that the object recognition device does not include the camera 113 and the radar 114 and that a signal is input from each of the camera 113 and the radar 114.

<Estimated Plane Region Detection Means 101>

The estimated plane region detection means 101 includes a threshold setting means 104, an edge detection means 106, a region division means 105, and a region combination means 107 as internal components. The estimated plane region detection means 101 detects the estimated plane region estimated to be a plane from the image from the camera 113. Specifically, based on information included in the image from the camera 113, an entire region is divided into regions considered to be constituted of one plane. For example, in a case where a surface of a road on which the vehicle is travelling and a side wall at a roadside are imaged in the image, the entire region is divided into a road surface region and a side wall region, each of which is detected as the estimated plane region.

Region division is performed mainly based on a luminance edge in the image. In addition, using a feature of texture at each position, the region division is performed based on a pattern feature quantity at each of the positions in the image. The edge detection means 106 detects the luminance edge in the image from the camera 113. In a case where the camera 113 is configured to be capable of color imaging, by generating an edge for each of RGB values, the division becomes possible by including color information as well.

The threshold setting means 104 sets a threshold for edge intensity that has been detected or for a difference in the feature quantity of the texture. The region division means 105 divides a region at a position where there is the edge intensity or the difference in the feature quantity equal to or greater than the threshold.

In this embodiment, the threshold, which is set by the threshold setting means 104, is set to a different value according to an average luminance of an entire screen or information extracted from the image. For example, on a snow-covered road, the luminance tends to be high throughout the entire screen, and contrast tends to be high, whereby it is preferred that a value of the edge intensity used in the region division be large. Furthermore, in an off-road scene, it is likely that the image has a low contrast between the road surface and an obstacle therearound, whereby it is preferred that the threshold be set to a low value such that the division can be performed based on a small change in the luminance and the texture.

In a case where a plurality of estimated plane regions is detected in the image from the camera 113, the region combination means 107 compares the plurality of estimated plane regions with each other and evaluates similarity therebetween. Then, the region combination means 107 combines the regions that are determined to have the similarity higher than a threshold and determines the regions to be on one and the same continuous plane. The region combination means 107 evaluates the similarity between the regions that have been divided by the region division means 105 and combines a couple of the regions having the high similarity. Thus, in a case where there is the distance data for one of the combined regions, it is possible to interpolate the distance data for the other by using the same plane equation, whereby an effect is provided that estimation of the distance data becomes possible for a wide region. Note that content of processing by the estimated plane region detection means 101 is described in detail in processing flows of FIGS. 4 to 6 hereinafter.

<Region Plane Estimation Means 102>

The region plane estimation means 102 includes a region plane equation estimation means 108, an estimated plane evaluation means 109, and a region subdivision means 110 as internal components. The region plane estimation means 102 verifies whether or not each of the estimated plane regions extracted by the estimated plane region detection means 101 is a plane based on the measured distance data from the radar. In a case where a large error exists between the plane equation for the estimated plane region and the measured distance data, or three-dimensional data, it is not possible to regard the estimated plane region as a plane, whereby subdivision of the estimated plane region is performed. Note that the plane equation is an equation for a plane expressed by three-axes coordinates.

The region plane equation estimation means 108 obtains the plane equation on an assumption that all of the measured distance data within the region is on one plane. The estimated plane evaluation means 109 evaluates the error between the plane equation and the measured distance data by using, for example, a difference value of a distance between the plane equation and the measured distance data and the like and evaluates estimation accuracy of the plane equation. In a case where this difference value is larger than a specified value and where it is considered that the error is large, subdivision in which the estimated plane region is further divided is performed by the region subdivision means 110.

In this way, by evaluating the accuracy of the plane equation that has been estimated and by performing the subdivision of the estimated plane region in a case where the large error exists, excess or deficiency of the region division based on image information is corrected, whereby an effect is obtained that the estimation of the distance can be performed with a smaller error. Note that content of processing by the region plane estimation means 102 is described in detail in processing flows of FIGS. 6 and 7 hereinafter.

<Distance Data Interpolation Means 103>

A distance interpolation means 103 includes an interpolation source data selection means 111 and a distance data interpolation means 112 as internal components. The distance interpolation means 103 interpolates and estimates a distance to a position, for which there is no measured distance data, by using the plane equation for each of the estimated plane regions obtained by the region plane estimation means 102 and a value of the measured distance data for a measurement point at a position within the estimated plane region.

The interpolation source data selection means 111 selects the measured distance data used for performing the estimation of the distance. The interpolation source data selection means 111 sets a predetermined selection range with a position on which the estimation is performed as a center and selects the measured distance data included in the selection range. The selection range is set according to a direction in which the estimated plane region faces.

By using the measured distance data included in the selection range, the distance data interpolation means 112 interpolates and estimates the distance to the position, for which there is no measured distance data, within the estimated plane region. Thus, an effect can be obtained that the estimation of the distance becomes possible with higher accuracy. An estimated value of the distance data (interpolated distance data) that has been obtained through interpolation by the distance data interpolation means 112 is stored in the distance data storage means 118 and is used for calculating an object distance by the object distance calculation means.

The object recognition device includes the object region detection means 115, the distance data selection means 116, and the object distance calculation means 117. The object region detection means 115 extracts an object-existing region based on the image from the camera 113. The distance data selection means 116 reads the measured distance data and the estimated value of the distance included in the object-existing region, which has been extracted by the object region detection means 115, from the distance data storage means 118. The object distance calculation means 117 calculates the distance to the object by using the measured distance data and the estimated value of the distance, which have been read from the distance data storage means 118.

Figure 2:
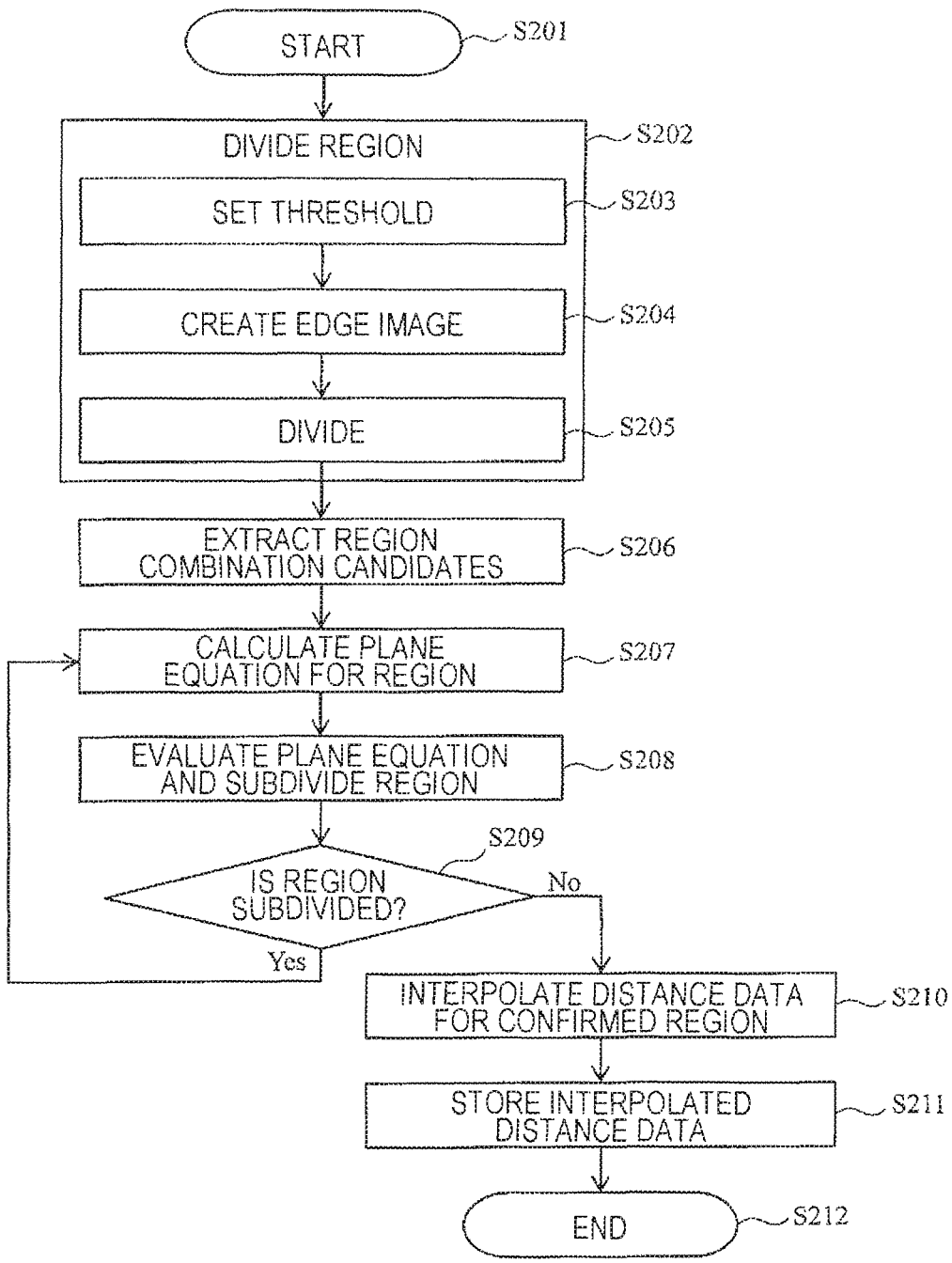
FIG. 2 is an overall processing flow.

FIG. 2 is a processing flow illustrating a flow of overall object detection processing by the object recognition device.

The processing starts (S201), and region division is performed (S202). Each of the processing of threshold setting (S203), edge image creation (S204), and division (S205) is performed. Each of the processing of the threshold setting (S203), the edge image creation (S204), and the division (S205) is performed by the threshold setting means 104, the edge detection means 106, and the region division means 105 illustrated in FIG. 1. The region division (S202) is described in detail in processing flow of FIG. 3.

After the region division (S205), region combination candidate extraction (S206) is performed. This processing corresponds to processing performed by the region combination means 107 illustrated in FIG. 1. In the region combination candidate extraction (S206), from among divided regions, a set of regions considered to be constituted of the same plane are combined. This corresponds to the processing performed by the region combination means 107 illustrated in FIG. 1.

Then, in plane equation calculation for the region (S207), the plane equation for the estimated plane region is obtained from the measured distance data within the divided region. This corresponds to processing performed by the region plane equation estimation means 108 in FIG. 1. After the plane equation has been obtained in step S207, plane equation evaluation and region subdivision (S208) are performed by using the measured distance data within the estimated plane region.

In step S208, by comparing the plane equation obtained in step S207 with a position of a three-dimensional point obtained from the measured distance data, it is evaluated whether or not all of data within the region agrees with the plane equation that has been obtained. In a case where there is any three-dimensional point that does not agree therewith, it means that estimation cannot be performed correctly either because a plane within the region is not on one plane and is constituted of a plurality of planes or because the plane has unevenness. Thus, the subdivision of the estimated plane region is performed.

In step S209, is determined whether or not the subdivision of the estimated plane region has been performed in step S208. In a case where the subdivision has been performed, the processing returns to step S207, and the plane equation for the estimated plane region that has been subdivided is calculated. On the other hand, in a case where the subdivision has not been performed, further division of the estimated plane region is not possible, whereby the estimated plane region is confirmed, and the processing shifts to step S210. In step S210, by using the measured distance data of the estimated plane region that has been confirmed, the distance to the position, for which there is no measured distance data, within the estimated plane region is interpolated and estimated. Then, in step S211, the interpolated distance data is stored in the distance data storage means 118, and the processing ends (S212).

Figure 3:
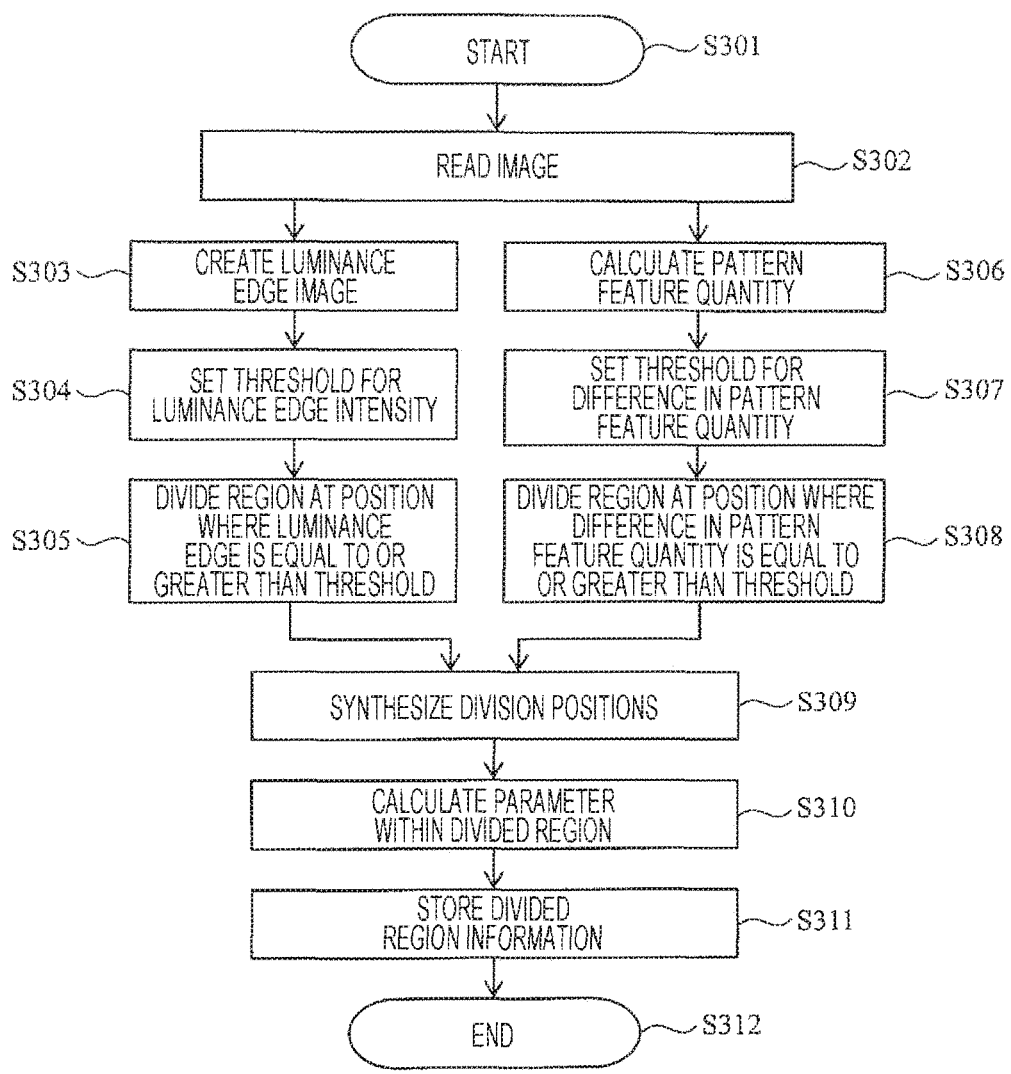
FIG. 3 is a processing flow of region division.

FIG. 3 is a flowchart illustrating content of processing of the region division (S202) in FIG. 2 in detail. As the processing of the region division, first, the image from the camera 113 is read (S302). Then, a luminance edge image is created (S303), and a pattern feature quantity is calculated (S306). With regard to the luminance edge, threshold setting for the luminance edge intensity (S304) and region division at a position where the luminance edge is equal to or greater than the threshold (S305) are performed.

With regard to the pattern feature quantity, a threshold is set for a difference in the pattern feature quantity (S307), and the region division is performed at the position where the difference in the pattern feature quantity is equal to or greater than the threshold, or at a position where texture changes (S308). In step S309, all of division positions are synthesized by integrating information on the region division that has been performed based on values of the luminance and the pattern feature quantity. Thus, the image is divided into the estimated plane regions that have been set based on the luminance and the pattern feature quantity.

In step S310, each of parameters within the region is obtained. The parameters are used for determining the similarity between the regions in the region combination candidate extraction (S206), and an average value, distribution, and the like of the luminance, hue, the pattern feature quantity within the region are included. Finally, in step S311, such information on the divided regions is stored, and the processing ends (S312).

Figure 4:
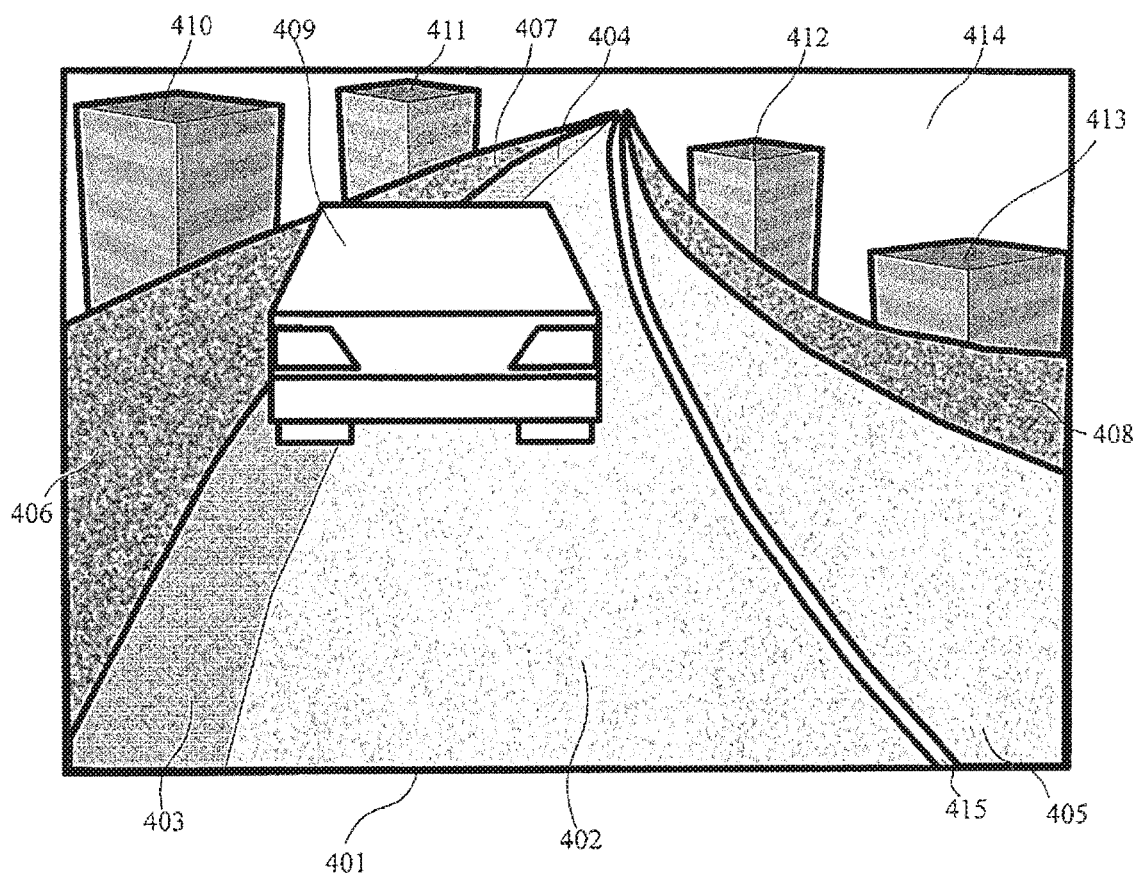
FIG. 4 is a conceptual diagram illustrating the region division.

FIG. 4 is a conceptual diagram illustrating the region division.

An image 401 illustrated in FIG. 4 is imaged by the camera 113. The image 401 is a scene of travelling on a general road following a proceeding vehicle. The image 401 is illustrated as an example of performing the region division based on the difference in the luminance edge and the pattern feature quantity, and the image 401 is divided into an A region 402 to an N region 415 in FIG. 4.

Among the regions, the A region 402, the B region 403, the C region 404, and the D region 405 constitute a road surface. All of these regions are on the same plane; however, the plane has been divided into the A region 402 to the D region 405 by a white line, or the N region 415. The B region 403 has been divided due to an influence of a shadow of a side wall that caused apart of the road surface to have a lower luminance. Although the E region 406 and the F region 407 constitute one continuous side wall surface, it is divided into separate regions by the proceeding vehicle.

In such case, the region combination means 107 in FIG. 1 combines the regions that are on the same plane but divided and serves to integrate the regions into one as a region constituted of the same plane.

In this embodiment, as conditions for performing combination, the following three conditions are described.

(1) The regions are combined when a difference in an average luminance, color (RGB), and a pattern feature quantity between the regions is equal to or smaller than a predetermined threshold (first threshold).

(2) The regions are combined when a difference in the average luminance between the regions is large to a certain degree (larger than a second threshold), but the difference in the color (RGB ratio) and the pattern feature quantity is very small (second threshold or below).

(3) With regard to the regions divided by a white line or a road surface paint, both of the regions as well as regions of such lines are combined together.

The above-described (1) represents a case where the luminance, the color, and the texture are similar as a whole, and the regions seem to be on the same plane. The above-described (2) represents a case where the same plane has been divided due to an influence of a shadow or the like such as the A region 402 and the B region 403 illustrated in FIG. 4. The above-described (3) represents a case where the regions seem to be different regions on appearance due to a road surface paint of a speed limit, a crosswalk, and the like within the region. Since such regions are naturally on the same plane, it is preferred that the regions be combined. To optimize such cases, the region combination means 107 has a function to determine the similarity between the regions and to combine such regions.

Figure 5:
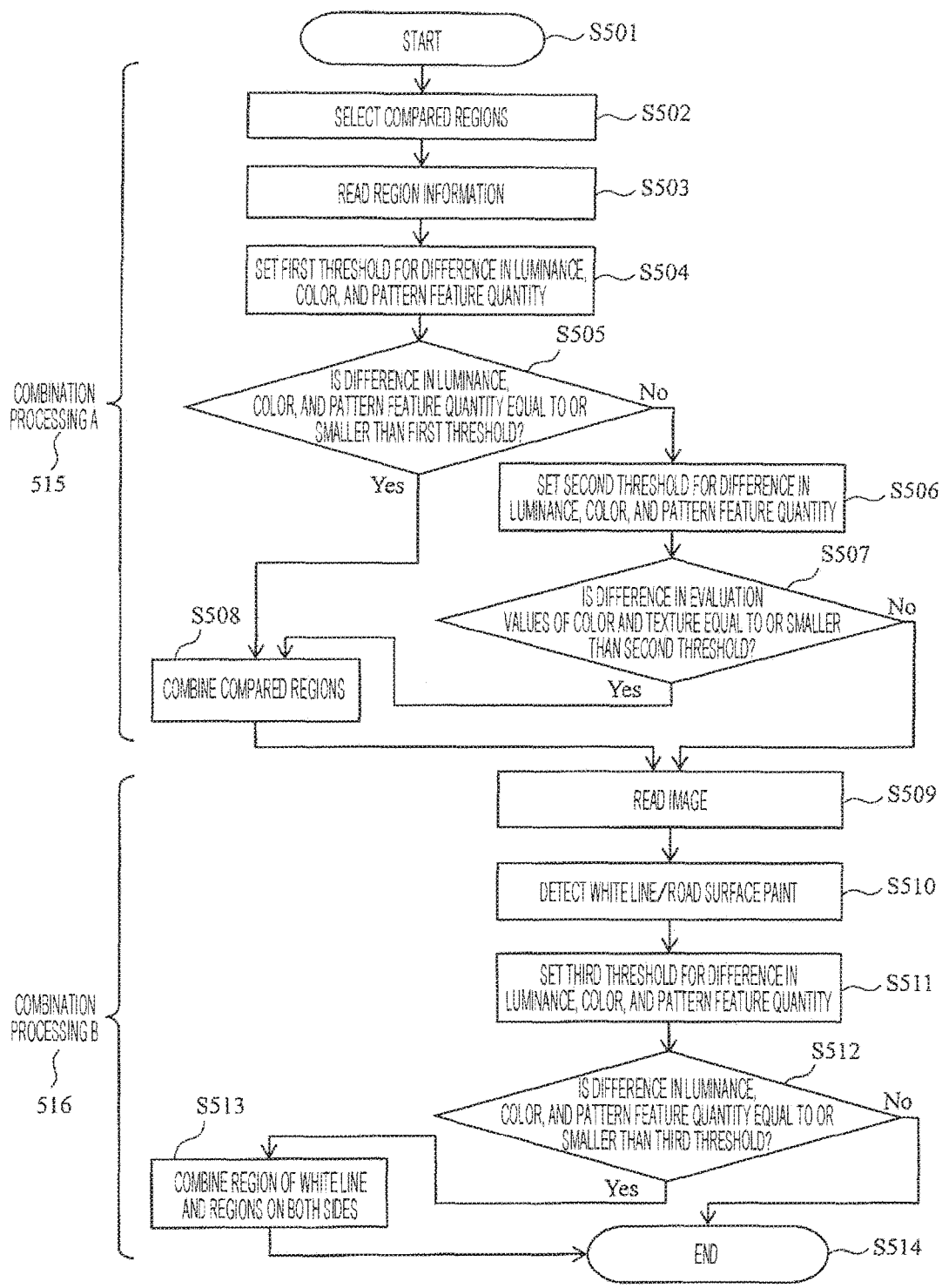
FIG. 5 is a processing flow of region combination candidate extraction.

Hereinafter, a flow of processing of the region combination means 107 is described in detail by using FIG. 5.

The processing starts (S501), and first, compared region selection (S502) is performed. Although comparison of the similarity between the regions may be performed for all of the regions, in this embodiment, to increase a possibility of being on the same plane, the comparison is performed between the regions having a shortest distance therebetween on a screen in a range of predetermined values.

As the comparison processing, region information is read (S503), and a first threshold is set for the luminance, the color, and the pattern feature quantity (S504). When each value is equal to or smaller than the threshold (yes in S505), the regions are determined as being on the same plane, and the compared regions are combined (S508). This corresponds to the combination in the above-described case (1).

At this point, in a case where the regions do not match with each other, a second threshold is set in step S506, and determination is performed on the combination in the above-described case (2) in which there is the large difference in the luminance, but there is the high similarity in the color and the texture (S507). In a case where the conditions are met at this point (yes in step S507), the processing shifts to step S508, and the compared regions are combined.

Instep S507, the regions are not combined in a case where the difference is equal to or greater than the threshold; however, in a case where a region of a focused point or an adjacent region thereof is the region of the white line or the road surface paint detected separately from the image, it corresponds to the above-described case (3), whereby the region of the white line/road surface paint and the regions adjoining on both sides are combined.

Specifically, the image is read in step S509, and the white line and the road surface paint are detected (S510). A third threshold is set for the difference in the luminance, the color, and the pattern feature quantity (S511), and it is determined whether or not the difference in the luminance, the color, and the pattern feature quantity is equal to or smaller than the third threshold (S512). Then, in a case where it is equal to or smaller than the third threshold (yes in S512), the region of the white line/road surface paint and the regions on both sides are combined (S513). On the other hand, the processing ends in a case where the difference is larger than the third threshold (no in S512) (S514).

Figure 6:
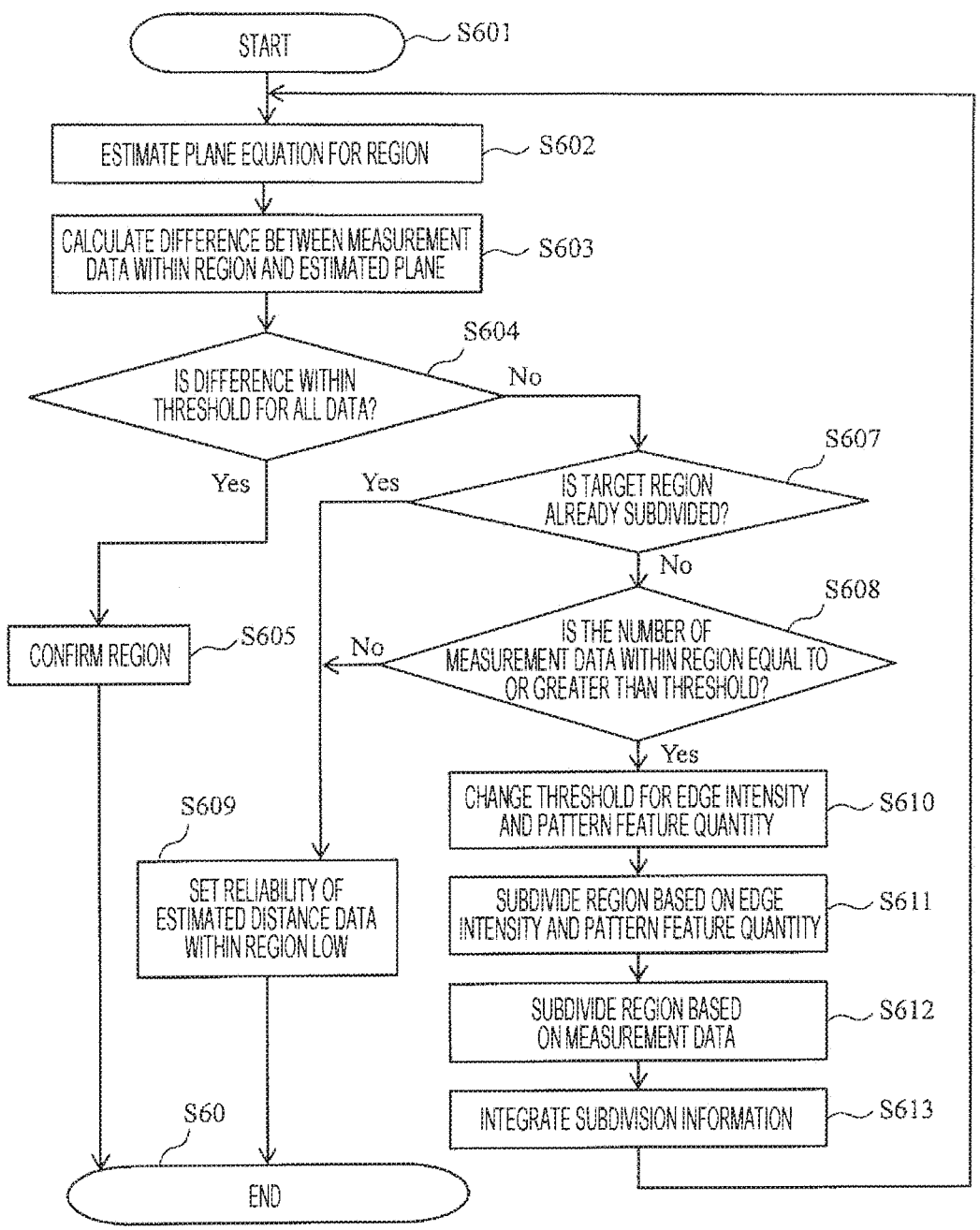
FIG. 6 is a detailed processing flow of plane equation evaluation and region subdivision.

FIG. 6 is a flowchart illustrating content of processing by the region plane estimation means 102.

The processing starts (S601), and an estimation of the plane equation for the estimated plane region is performed by using the measured distance data within the estimated plane region (S602). In step S603, a difference between the measured distance data of all measurement points within the estimated plane region and an estimated plane expressed by the plane equation is calculated. Instep S604, it is determined whether or not the difference is within the threshold for all of the data. At this point, in a case where the difference is within the threshold for all of the data, all of the measurement points are positioned within a distance equal to or smaller than a threshold from the estimated plane, whereby it is considered that the plane equation for the estimated plane region is correct, and processing of confirming the region is performed (S605).

On the other hand, in step S604, in a case where it is determined that the difference is not within the threshold for all of the data, or there is measured distance data having a separation distance to the estimated plane exceeding the threshold, it is determined whether or not to subdivide the estimated plane region (step S607 and step S608). In step S607, it is checked whether or not the estimated plane region has already been subdivided, and in step S608, it is checked whether or not the number of the measured distance data within the estimated plane region is equal to or greater than the threshold.

In a case where the estimated plane region has already been subdivided (yes in step S607), no further division is performed, and the processing shifts to step S609. In a case where the number of the measured distance data within the estimated plane region is smaller than the threshold (no instep S608), it is not possible to obtain the plane equation by performing any further region division, whereby the processing shifts to step S609.

In step S609, reliability is set low for the estimated distance data for the region. Since the estimated distance data for which the reliability is set low is likely to be a wrong value or a value with a large error, the data is not to be used in a control of obstacle avoidance and the like, whereby an effect can be obtained that it is possible to prevent the system from performing avoidance operation based on misdetection. Note that at least three measured distance data are required for obtaining the plane equation, and in step S608, a threshold therefor is set to four.

In a case where it is determined that the region has not been subdivided in step S607 and that the number of the measured distance data within the estimated plane region is equal to or greater than the threshold in step S608 (yes in step S608), the thresholds for the edge intensity and the pattern feature quantity are changed (step S610), and the subdivision of the region is performed based on the edge intensity and the pattern feature quantity (step S611). Then, the subdivision of the region is performed based on the measured data (S612), and a result of the subdivision performed in the processing is integrated (S613). On the subdivided regions, the processing is repeated from the estimation of the plane equation of step S602 and the like. The content of the processing of the region division based on the measured data (S612) is described in detail in processing flow of FIG. 7.

In this way, in the processing by the region plane estimation means 102 illustrated in FIG. 6, the subdivision of the estimated plane region is performed to obtain an accurate plane equation, whereby an effect can be obtained that the estimation of the distance within the region is accurately performed through interpolation.

Figure 7:
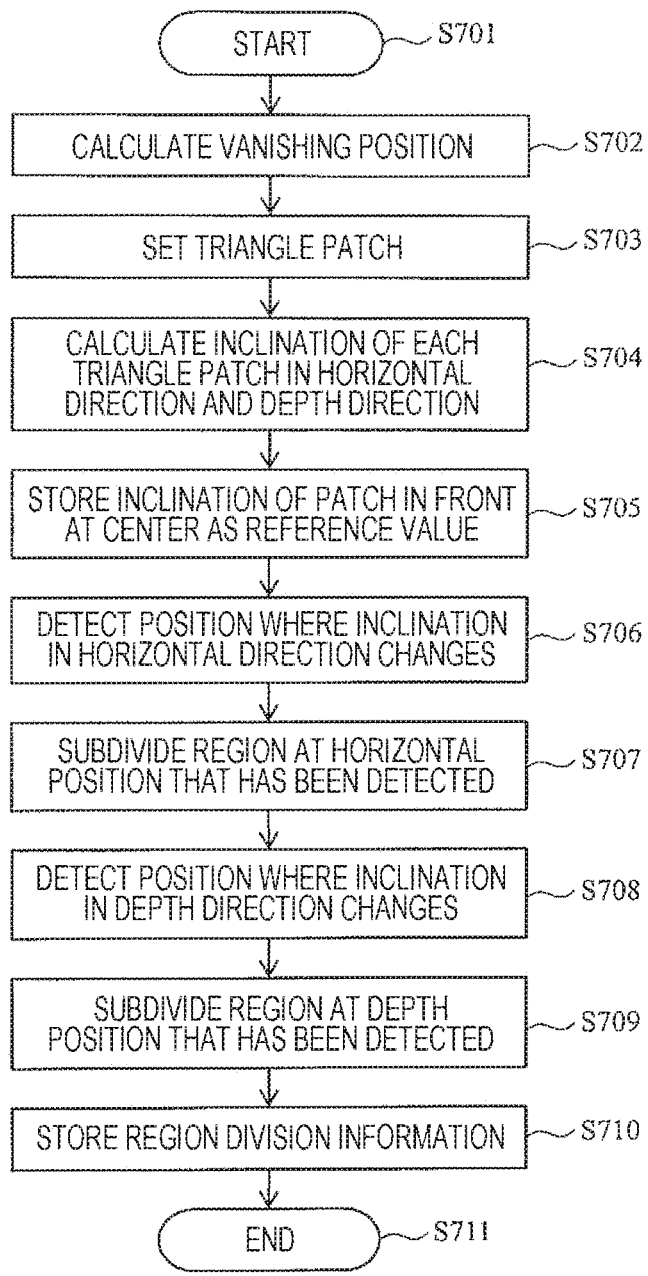
FIG. 7 is a processing flow of the region subdivision based on measured data.

FIG. 7 is a flowchart illustrating content of the processing of subdividing the region by using the measured distance data.

The processing starts (S701), and a vanishing point is obtained from the image (S702). Subsequently, a triangle patch connecting the adjoining measured data within the region is virtually set (S703), and an inclination in a height direction of each of the triangle patches both in a horizontal direction and a depth direction is calculated (S704).

Figure 8:
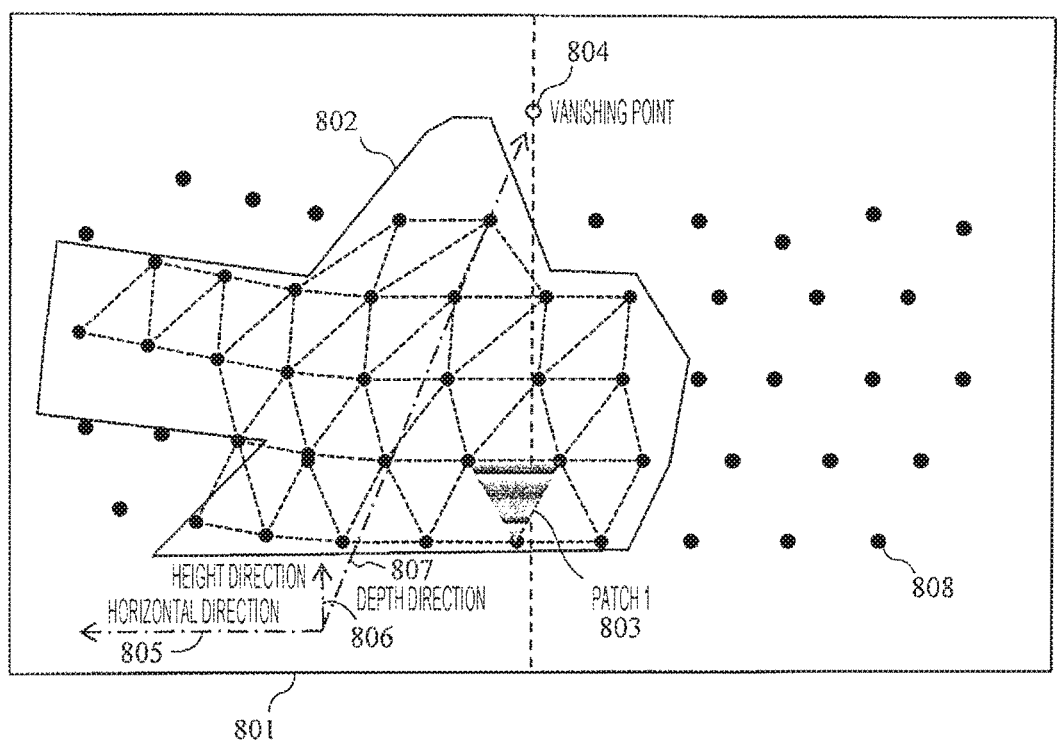
FIG. 8 is an explanatory drawing of the region subdivision based on the measured data.

FIG. 8 is an explanatory drawing illustrating setting of the triangle patch. In an image 801, there is set the triangle patch connecting measurement points 808 included in an estimated plane region 802 to be divided, and the inclination of each of the patches is calculated.

The inclination to be obtained is a rate of change in a height direction 806 both in a horizontal direction 805 and in a depth direction 807, or a direction toward the vanishing point, in a coordinate illustrated in FIG. 8. This is equivalent to an upward angle relative to the horizontal direction 805 and the depth direction 807.

In FIG. 8, as a starting point, there is set a reference patch 803, which is a frontmost patch near the center among a plurality of patches within the estimated plane region 802. The reference patch 803 is compared with a patch therearound in terms of the inclination in the horizontal direction and the depth direction. Then, any patch having a value of the inclination exceeding a threshold is extracted, and the subdivision of the region is performed at a center position of the extracted patch.

In the processing flow, in step S705 in FIG. 7, the inclination of the patch in the front at the center is stored as a reference value, and the value of the inclination is compared in the horizontal direction and the depth direction. A position of the subdivision is determined by connecting the center position of the patches for which a difference of the inclination with the reference value is equal to or greater than the threshold.

Specifically, a position where the inclination in the horizontal direction changes is detected (S706), and the region is subdivided at a horizontal position that has been detected (S707). A position where the inclination in the depth direction changes is detected (S708), and the region is subdivided at a depth position that has been detected (S709). Then, information on the region division is stored (S710).

Figure 9:
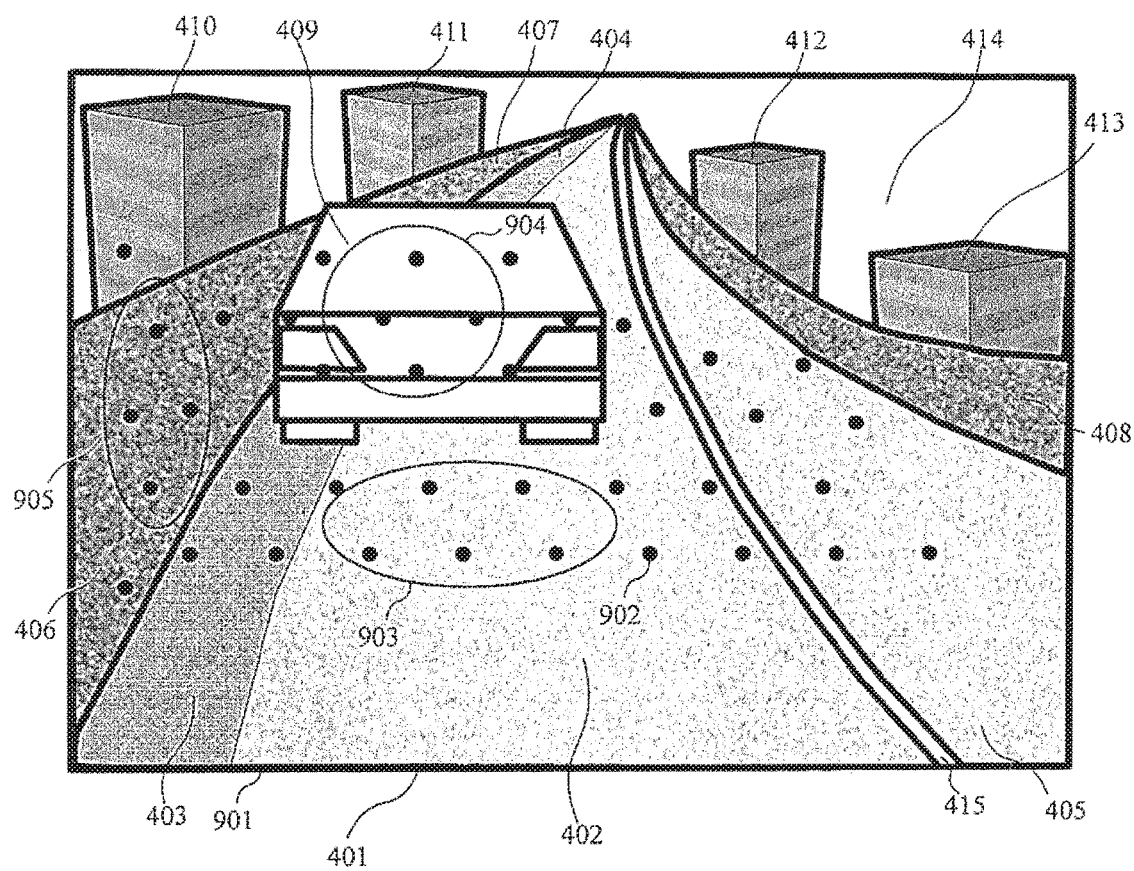
FIG. 9 is an explanatory drawing of distance data interpolation.

FIG. 9 is an explanatory drawing illustrating operation of the interpolation source data selection means 111 illustrated in FIG. 1.

In FIG. 9, there are illustrated three planes that are a road surface, which is a horizontal plane, a rear face of a proceeding vehicle, which is a vertical plane opposing a direction of the camera 113, and a side wall, which is a vertical plane parallel to the direction of the camera 113.

In interpolating the measured distance data within the estimated plane region, for a region that is the vertical plane opposing the direction of the camera 113 such as the rear face of the proceeding vehicle, all of the distance data within the region are the same value. Thus, in this embodiment, in a case where the region is the vertical plane opposing the direction of the camera 113, a circular area 904 having a truly-circular shape is set with the focused point as the center by the interpolation source data selection means 111, and the measured distance data within the circular area 904 is selected as interpolation source data. Then, the interpolation source data is interpolated by the distance data interpolation means 112 to estimate a distance to the focused point.

On the other hand, for a region that is the horizontal plane such as the road surface, the distance data within the region have the same value in the horizontal direction while the value thereof changes toward infinity in the depth direction. Thus, in this embodiment, in a case where the region is the horizontal plane, a horizontally elliptical area 903 having an elliptical shape wider in the horizontal direction is set as an area less likely to have an error with the focused point as the center by the interpolation source data selection means 111, and the measured distance data within the horizontally elliptical area 903 is selected as the interpolation source data. Then, the interpolation source data is interpolated by the distance data interpolation means 112 to estimate the distance to the focused point.

Furthermore, for a region that is the vertical plane parallel to the direction of the camera 113 such as the side wall, the distance is not changed by a move in the height direction while a value thereof changes by the move in the depth direction. Thus, in this embodiment, in a case where the region is the vertical plane parallel to the direction of the camera 113, a vertically elliptical area 905 having an elliptical shape longer in a vertical direction is set with the focused point as the center by the interpolation source data selection means 111, and the measured data within the vertically elliptical area 905 is selected as the interpolation source data. Then, the interpolation source data is interpolated by the distance data interpolation means 112 to estimate the distance to the focused point. In this way, by estimating the distance to the focused point by using the measured data within the area having the shape suitable for a direction in which the region to be estimated faces, an effect can be obtained that the estimation of the distance becomes possible with higher accuracy.

Note that a configuration of the object recognition device has been described in the above-described embodiment;

however, the configuration may also be used as an evaluation device for evaluating detection accuracy in detecting a travelling object.

The embodiment of the present invention has been described in detail; however, the present invention is not to be limited to the above-described embodiment, and various design changes may be added within a scope not deviating from the spirit of the present invention described in claims. For example, the above-described embodiment has been described in detail to facilitate understanding of the present invention, and the present invention is not to be limited to an embodiment provided with all of the configurations that have been described. Furthermore, a part of the configuration of one embodiment may be replaced with a configuration of another embodiment, or the configuration of the other embodiment may be added to the configuration of one embodiment. Still furthermore, a part of the configuration of each of the embodiments may be deleted, added with, or replaced with another configuration.

REFERENCE SIGNS LIST 101 estimated plane region detection means
102 region plane estimation means
103 distance data interpolation means
104 threshold setting means
105 region division means
106 edge detection means
107 region combination means
108 region plane equation estimation means
109 estimated plane evaluation means
110 region subdivision means
111 interpolation source data selection means
112 distance data interpolation means
113 camera
114 radar
115 object region detection means
116 distance data selection means
117 distance calculation means
118 distance data storage means

The invention claimed is:

1. An object recognition device configured to recognize an object based on an image from a camera and measured distance data from a radar, the object recognition device comprising a processor configured to:
   detect an estimated plane region estimated to be a plane from the image;
   calculate a plane equation for the estimated plane region; and
   interpolate and estimate distance data within the estimated plane region based on the plane equation and the measured distance data from the radar,
   wherein responsive to a plurality of estimated plane regions being detected from the image, the processor compares the plurality of estimated plane regions with each other to evaluate similarity therebetween, combines the regions when a difference in an average luminance, color, and a pattern feature quantity between the regions is equal to or smaller than a predetermined threshold, and determines the regions to be on one and the same continuous plane.

2. The object recognition device according to claim 1, wherein
   the object recognition device obtains a distance to the object by using the distance data having been interpolated and estimated by the processor.

3. The object recognition device according to claim 1, wherein the processor changes a selection range of the measured distance data being used in calculation of the distance data of a focused point based on a direction in which the plane region faces.

4. An object recognition device configured to recognize an object based on an image from a camera and measured distance data from a radar, the object recognition device comprising a processor configured to:
   detect an estimated plane region estimated to be a plane from the image;
   calculate a plane equation for the estimated plane region; and
   interpolate and estimate distance data within the estimated plane region based on the plane equation and the measured distance data from the radar,
   wherein the processor determines, based on the measured distance data, whether or not the estimated plane region is on the same plane having a smoothness within a criterion set in advance and, in a case where the region is not on the same plane, performs region subdivision in which the estimated plane region is divided into a plurality of plane regions.

5. The object recognition device according to claim 4, wherein
   in a case where a plurality of estimated plane regions are detected from the image, the processor compares the plurality of estimated plane regions with each other to evaluate similarity therebetween, combines the regions for which the similarity is determined as being higher than a threshold, and determines the regions to be on one and the same continuous plane.

6. The object recognition device according to claim 5, wherein the processor uses at least one of luminance, color, or a pattern feature quantity of the estimated plane region as a criterion for evaluating the similarity.

7. The object recognition device according to claim 4, wherein a subdivision position of the estimated plane region is determined based on the measured distance data.

8. The object recognition device according to claim 4, wherein
   the object recognition device obtains a distance to the object by using the distance data having been interpolated and estimated by the processor.

9. The object recognition device according to claim 4, wherein
   the processor changes a selection range of the measured distance data being used in calculation of the distance data of a focused point according to a direction in which the plane region faces.

* * * * *